US012774717B2

(12) United States Patent
Miyajima

(10) Patent No.: US 12,774,717 B2
(45) Date of Patent: Oct. 27, 2026

(54) LIMITED STROKE LINEAR GUIDE DEVICE

(71) Applicant: THK CO., LTD., Tokyo (JP)

(72) Inventor: Ayako Miyajima, Tokyo (JP)

(73) Assignee: THK CO., LTD., Tokyo (JP)

( * ) Notice: Subject to any disclaimer, the term of this patent is extended or adjusted under 35 U.S.C. 154(b) by 196 days.

(21) Appl. No.: 18/689,915

(22) PCT Filed: Aug. 1, 2022

(86) PCT No.: PCT/JP2022/029497
§ 371 (c)(1),
(2) Date: Mar. 7, 2024

(87) PCT Pub. No.: WO2023/042558
PCT Pub. Date: Mar. 23, 2023

(65) Prior Publication Data

US 2024/0369102 A1 Nov. 7, 2024

(30) Foreign Application Priority Data

Sep. 17, 2021 (JP) ................................ 2021-152524

(51) Int. Cl.
*F16C 29/04* (2006.01)

(52) U.S. Cl.
CPC .................................... *F16C 29/04* (2013.01)

(58) Field of Classification Search
CPC .. F16C 29/04; F16C 29/0607; F16C 29/0638; F16C 29/10; F16C 33/306; A47B 88/40; A47B 88/477; A47B 88/57
(Continued)

(56) References Cited

U.S. PATENT DOCUMENTS 4,929,097 A * 5/1990 Mottate .................. F16C 29/04 312/331

FOREIGN PATENT DOCUMENTS

JP 59-147116 A 8/1984
JP S59147116 A * 8/1984
(Continued)

OTHER PUBLICATIONS

International Search Report dated Oct. 18, 2022, issued in counterpart International Application No. PCT/JP2022/029497, with English Translation. (2 pages).

*Primary Examiner* — John Olszewski
*Assistant Examiner* — Aimee Tran Nguyen
(74) *Attorney, Agent, or Firm* — WHDA, LLP

(57) ABSTRACT

Provided is a finite stroke type linear guide device including: a guide member (3) including a guide groove (30) and formed into a channel shape; a shaft member (4) configured to move inside the guide groove (30) along a longitudinal direction of the guide groove (30); a large number of rolling elements configured to roll between the guide member (3) and the shaft member (4) while bearing a load; and a cage (5) configured to be arranged inside the guide groove (30) of the guide member (3) so as to be present in a gap between the guide member (3) and the shaft member (4), the large number of rolling elements being rotatably arranged in the cage (5). Stoppers (6) are provided at both ends of the guide member (3) in a longitudinal direction, respectively, and are configured to allow the cage (5) to be brought into abutment against each of the stoppers (6). While the shaft member (4) has a regulating hole (42) which is elongated along a moving direction of the shaft member (4), the cage (5) has a locking protrusion (50) provided upright on the cage (5) and having a distal end part inserted into the regulating hole (42).

4 Claims, 5 Drawing Sheets

(58) Field of Classification Search
USPC .............................................. 312/333, 334.44
See application file for complete search history.

(56) References Cited

FOREIGN PATENT DOCUMENTS

| | | | | |
|---|---|---|---|---|
| JP | 2004-19767 | A | | 1/2004 |
| JP | 2004019767 | A | * | 1/2004 |
| JP | 2016116555 | A | * | 6/2016 |

* cited by examiner

LIMITED STROKE LINEAR GUIDE DEVICE

TECHNICAL FIELD

The present invention relates to a linear guide device for linearly moving an article within a predetermined stroke range.

BACKGROUND ART

As a linear guide device of this type, there has been known a linear guide device as disclosed in Patent Literature 1. This linear guide device includes: a shaft member which is formed to have a substantially rectangular shape in cross section, and has right and left side surfaces each having a rolling surface for rolling elements; a guide member which is movable along the shaft member; a large number of rolling elements configured to roll between the shaft member and the guide member while bearing a load; and a cage, which is configured to be arranged in a gap between the shaft member and the guide member, and has the large number of rolling elements rotatably arranged in the cage.

The guide member is formed into a groove shape with a guide groove that allows the shaft member to be loosely fitted to the guide groove. Rolling surfaces that face rolling surfaces of the shaft member are provided on both side surfaces of the guide groove. The rolling elements are in contact with the rolling surfaces of the shaft member and the rolling surfaces of the guide member, and roll between the shaft member and the guide member. The cage is formed into a thin plate shape, and is present in the gap between the shaft member and the guide member. The cage has a large number of accommodation holes that allow the large number of rolling elements to be arranged at predetermined intervals. The rolling elements freely rotates inside the accommodation holes of the cage while rolling on the rolling surfaces of the shaft member and the rolling surfaces of the guide member.

When the guide member moves along the shaft member, theoretically, the cage moves relative to the shaft member by ½ of a movement amount of the guide member. When the cage comes off from the area between the shaft member and the guide member, there arises a concern in that the rolling elements may roll out of the accommodation holes of the cage. Thus, this rolling guide device includes a mechanism for restricting a stroke range of the cage with respect to the guide member and a stroke range of the cage with respect to the shaft member.

An elongated regulating hole is formed in the cage along a moving direction of the guide member, and a locking protrusion is provided inside the guide groove of the guide member. The locking protrusion is inserted into the regulating hole of the cage. With this configuration, the stroke range of the cage with respect to the guide member is restricted. Further, a pair of stoppers are provided in the vicinity of both ends of the shaft member in a longitudinal direction, respectively, and hence, the cage can make a stroke along the shaft member only between those stoppers.

CITATION LIST

Patent Literature

[PTL 1] JP 2004-19767 A

DISCLOSURE OF THE INVENTION

Problem to be Solved by the Invention

The rolling elements are not only in rolling contact but also in slight sliding contact with the rolling surfaces of the shaft member and the guide member. Accordingly, when the guide member repeatedly performs a reciprocating motion with respect to the shaft member, a position of the cage is gradually displaced relative to the guide member and the shaft member. When such positional displacement of the cage occurs, the stroke range of the guide member with respect to the shaft member is excessively restricted, and hence it is required to perform a reset operation for periodically eliminating the positional displacement, during operation of the guide member. This reset operation is performed by forcibly moving the guide member under a state in which the locking protrusion is locked to an end part of the regulating hole of the cage, and accordingly, the cage moves relative to the shaft member while dragging the rolling elements, and then is brought into abutment against the stopper.

In this reset operation, the end part of the regulating hole formed in the cage is strongly pressed by the locking protrusion of the guide member, and hence there is a concern in that buckling may occur at the end part of the regulating hole in the cage. As a countermeasure thereagainst, it is conceivable to ensure the strength of the cage by, for example, increasing a wall thickness of the cage. However, for such a countermeasure, it is required to enlarge the gap between the shaft member and the guide member, and hence there has been a problem in that it is difficult to achieve reduction in size of the guide member, that is, reduction in size of the linear guide device.

Means for Solving the Problems

The present invention has been made in view of the above-mentioned problems, and has an object to provide a finite stroke type linear guide device capable of ensuring sufficient strength of a locking protrusion or a regulating hole against a reset operation for a cage, and also minimizing a gap between a shaft member and a guide member to achieve reduction in size of the entire device.

That is, a linear guide device according to the present invention includes: a guide member including a guide groove surrounded by a base portion and a pair of side wall portions, each of the side wall portions having a rolling groove for rolling elements, which is formed along a longitudinal direction of the guide groove so as to face the guide groove; a shaft member which is configured to move inside the guide groove of the guide member along the longitudinal direction of the guide groove, and includes rolling grooves facing the rolling grooves of the guide member; a large number of rolling elements configured to roll between the rolling groove of the guide member and the rolling groove of the shaft member while bearing a load; and a cage, which is configured to be arranged inside the guide groove of the guide member so as to be present in a gap between the guide member and the shaft member, and has the large number of rolling elements being rotatably arranged in the cage. Further, any one of the guide member or the shaft member has a stopper provided at an end part in a longitudinal direction and configured to allow the cage to be brought into abutment against the stopper. While another one of the guide member or the shaft member has a regulating hole which is elongated along a moving direction of the shaft member, the cage has a locking protrusion provided upright on the cage and having a distal end part inserted into the regulating hole.

Effects of the Invention

According to the linear guide device of the present invention, a positional relationship between the guide member and the cage, or a positional relationship between the shaft member and the cage is restricted by the regulating hole and the locking protrusion. In this case, while the regulating hole is formed in the guide member or the shaft member, the locking protrusion is provided upright on the cage. Hence, even when the locking protrusion is strongly brought into abutment against the end part of the regulating hole, there is no concern in that deformation, such as buckling, of the regulating hole or the locking protrusion may be caused. Accordingly, it is possible to ensure sufficient strength of the locking protrusion or the regulating hole against the reset operation for the cage, and also to enhance a degree of freedom in design of the cage and minimize the gap between the shaft member and the guide member to achieve reduction in size of the entire device.

MODE FOR CARRYING OUT THE INVENTION

Now, a linear guide device according to the present invention is described in detail with reference to the attached drawings.

Figure 1:
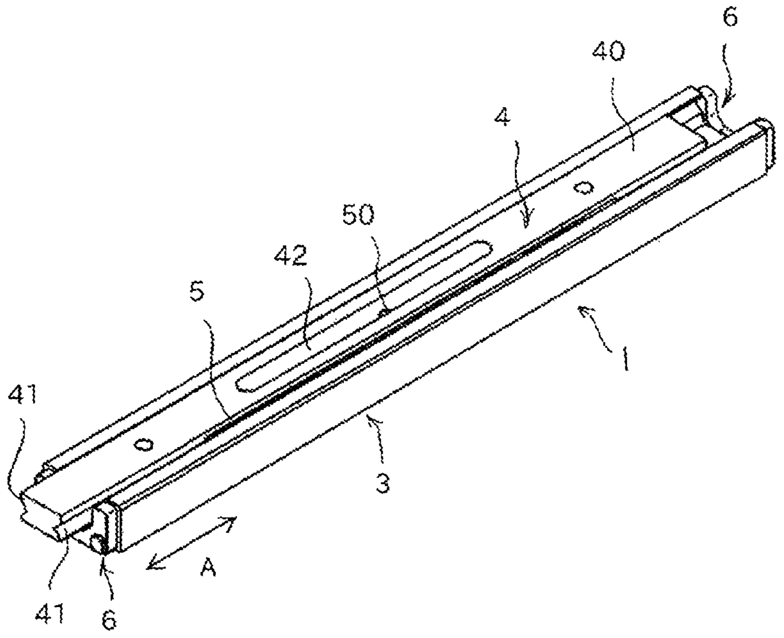
FIG. 1 is a perspective view for illustrating one example of a linear guide device according to one embodiment of the present invention.

FIG. 1 is illustration of one example of a linear guide device 1 to which the present invention has been applied. As illustrated in FIG. 1, the linear guide device 1 is configured by combining a guide member 3 and a shaft member 4 with each other through intermediation of a large number of rollers serving as rolling elements. The shaft member 4 is freely moved in a longitudinal direction of the guide member 3 (direction indicated by the arrow line A of FIG. 1) so that the shaft member 4 can be accommodated inside the guide member 3, or the shaft member 4 can be pulled out from the guide member 3. Accordingly, for example, when the guide member 3 is fixed to a fixed portion of a mechanical device, and the shaft member 4 is fixed to a movable portion of the mechanical device, the movable portion can be freely moved relative to the fixed portion within a predetermined stroke range.

Figure 2:
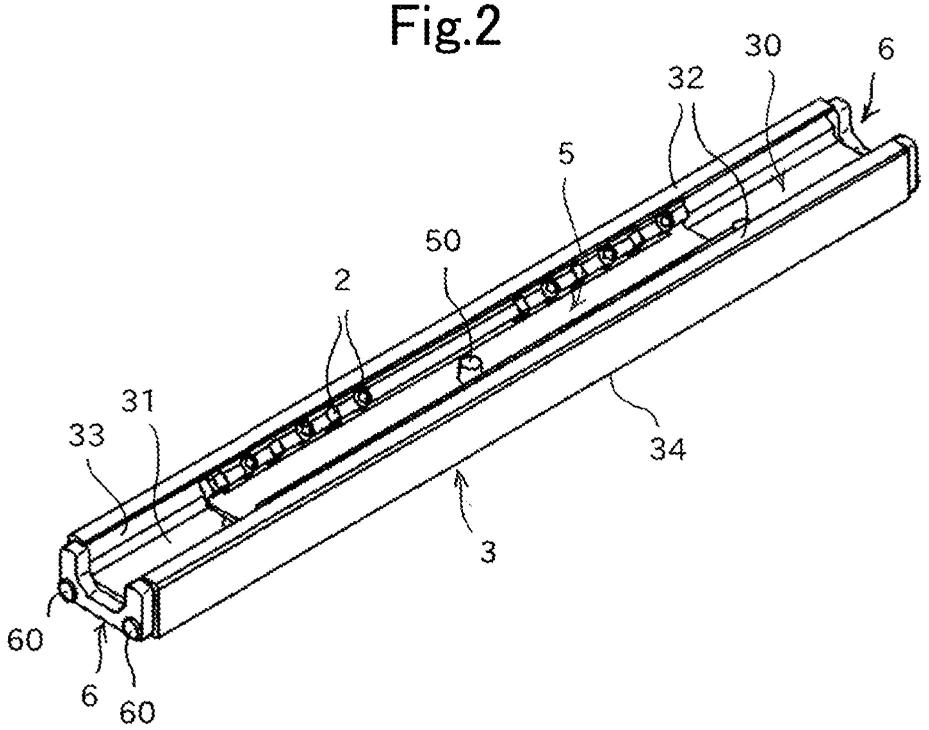
FIG. 2 is a perspective view for illustrating a state in which a shaft member has been removed from the linear guide device illustrated in FIG. 1.

FIG. 2 is illustration of the guide member 3 from which the shaft member 4 has been removed. The guide member 3 is formed into a substantially C-shape in cross section with a guide groove 30, and includes a base portion 31 and a pair of side wall portions 32. The pair of side wall portions 32 stand upright from the base portion 31 so that the guide groove 30 is located between the pair of side wall portions 32, and each of the side wall portions 32 is orthogonal to the base portion 31. The guide groove 30 functions as an accommodation space for the shaft member 4. A rolling groove 33 for the rollers 2 is formed in each of the side wall portions 32 so as to face the guide groove 30, and the rolling groove 33 extends over the entire length of the guide member 3 along a longitudinal direction of the guide groove 30. Further, the base portion 31 includes a mounting surface 34 which is to be brought into abutment against the fixed portion of the mechanical device.

Meanwhile, as illustrated in FIG. 1, the shaft member 4 is a rod-shaped member which is to be accommodated inside the guide groove 30 of the guide member 3, and has a substantially rectangular cross section orthogonal to the longitudinal direction. Further, the shaft member 4 includes a mounting surface 40 which is to be brought into abutment against the movable portion of the mechanical device, and the mounting surface 40 is arranged at a position slightly protruding from end parts of the pair of side wall portions 32 of the guide member 3, that is, outside the guide groove 30 of the guide member 3. As a result, the movable portion and the guide member 3 are prevented from interfering with each other. A rolling groove 41 for the rollers 2 is formed in each of wall surfaces of the shaft member 4 which face the side wall portions 32 of the guide member 3, respectively. The rolling groove 41 on the shaft member 4 side is formed at a position directly opposing the rolling groove 33 on the guide member 3 side, and the large number of rollers 2 are arranged between the rolling groove 33 on the guide member 3 side and the rolling groove 41 on the shaft member 4 side.

Figure 3:
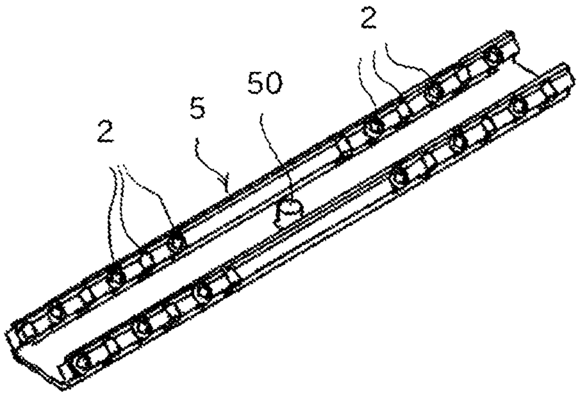
FIG. 3 is a perspective view for illustrating a cage of the linear guide device illustrated in FIG. 1.

A cage 5 is arranged inside the guide groove 30 of the guide member 3, and under a state in which the guide member 3 and the shaft member 4 have been combined with each other (see FIG. 1), the cage 5 is present in a gap between the guide member 3 and the shaft member 4. As illustrated in FIG. 3, the cage 5 is formed into a groove shape extending along the guide groove 30 of the guide member 3, and has a large number of accommodation holes in which the rollers 2 are to be arranged and which are formed at predetermined intervals along the rolling groove 33 of the guide member 3. The rollers 2 are rotatably held inside the accommodation holes, and are in contact with the rolling groove 33 of the guide member 3 and the rolling groove 41 of the shaft member 4. In this embodiment, the cage 5 is manufactured by injection molding of a synthetic resin, and after the injection molding, the rollers 2 are inserted into the accommodation holes, respectively.

In this embodiment, the rollers 2 are arranged as so-called cross rollers in the cage 5, and two rollers 2 adjacent to each other in the same rolling groove 33 have respective rotation axes orthogonal to each other. Accordingly, the rolling groove 33 of the guide member 3 and the rolling groove 41 of the shaft member 4 are each formed as a V-shaped groove obtained by a pair of rolling surfaces intersecting with each other at an angle of 90 degrees.

Figure 4:
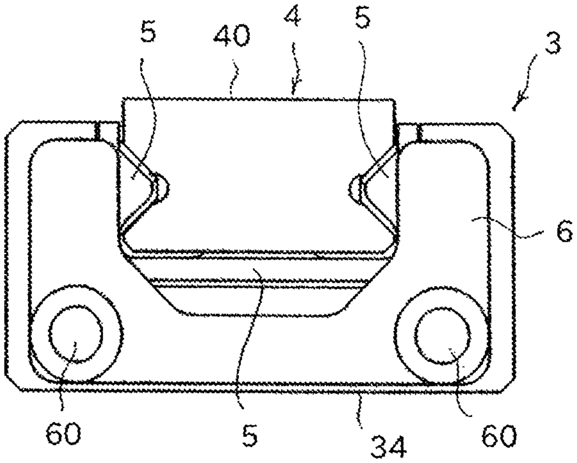
FIG. 4 is a front view for illustrating the linear guide device illustrated in FIG. 1 when observed from a longitudinal direction of a guide member.

A pair of stoppers 6 for locking movement of the cage 5 are provided at both end parts of the guide member 3 in the longitudinal direction, respectively. Further, those stoppers 6 are fastened to end surfaces of the guide member 3, respectively, with fixing screws 60. FIG. 4 is illustration of a positional relationship among the guide member 3, the cage 5, and the shaft member 4 when observed from the longitudinal direction of the guide member. As illustrated in FIG. 4, each of the stoppers 6 is formed in such a size that the stopper 6 does not overlap the shaft member 4, and overlaps a part of the cage 5. Accordingly, when the shaft member is moved relative to the guide member, the shaft member is pulled out from the guide groove of the guide member without interfering with the stopper 6, but the cage 5 is brought into abutment against the stopper 6 at the end part of the guide member 3. Hence, the cage 5 can move only inside the guide groove 30 of the guide member 3.

Figure 5:
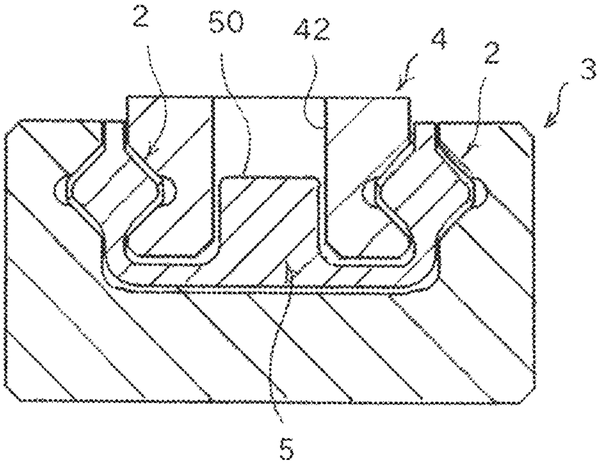
FIG. 5 is a sectional view taken along the line V-V of FIG. 1.

Further, the cage 5 includes a locking protrusion 50 having a columnar shape, in the vicinity of a center in the longitudinal direction. The locking protrusion 50 stands upright from the cage 5 toward the shaft member 4, and as illustrated in FIG. 5, a distal end part of the locking protrusion 50 is inserted into a regulating hole 42 formed in the shaft member 4. The regulating hole 42 of the shaft member 4 is formed into an elongated slit shape extending along a moving direction of the shaft member 4 (see FIG. 1), and extends through the shaft member 4. As long as the regulating hole 42 can receive a distal end of the locking protrusion 50, it is not required that the regulating hole 42 be formed to extend through the shaft member 4.

The regulating hole 42 has a width which is set to be larger than a diameter of the locking protrusion 50, and hence, when the shaft member 4 moves relative to the cage 5, the locking protrusion 50 can freely move inside the regulating hole 42. Further, both end parts of the regulating hole 42 in the longitudinal direction are each formed into a semicircular shape approximate to an outer shape of the locking protrusion 50, and thus, are configured such that the locking protrusion 50 of the cage 5 is brought into contact with each of the both end parts of the regulating hole 42 under a state close to surface contact. In a case in which the locking protrusion 50 is formed into a prismatic shape, it is preferred that the both end parts of the regulating hole 42 in the longitudinal direction be each formed into a rectangular shape so that the locking protrusion 50 is brought into surface contact with the both end parts of the regulating hole 42.

Figure 6:
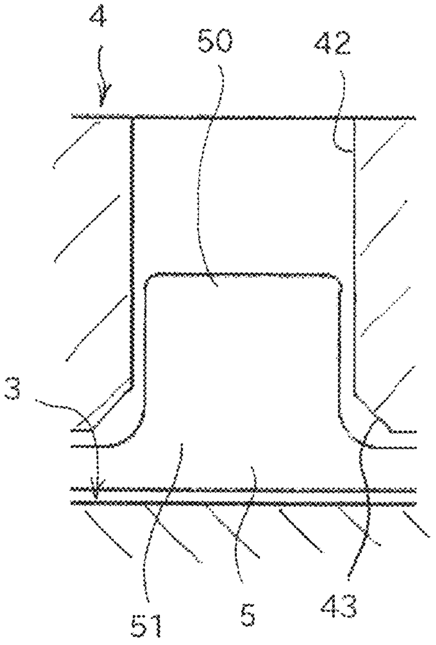
FIG. 6 is a sectional view for illustrating a relationship between a locking protrusion of the cage and a regulating hole of the shaft member.

Moreover, as illustrated in FIG. 6, the locking protrusion 50 provided upright on the cage 5 has a root part 51 with a diameter which is gradually increased so that the root part 51 is smoothly continuous to the cage 5. Further, the regulating hole 42 of the shaft member 4 has an edge part which faces the cage 5, and an expanded portion 43 is provided at the edge part to thereby prevent interference between the root part 51 of the locking protrusion 50 and the shaft member 4.

Theoretically, the cage 5 moves relative to the guide member 3 by ½ of a stroke amount of the shaft member 4 with respect to the guide member 3. Accordingly, a length of the regulating hole 42 in the moving direction of the shaft member 4 is set to ½ of the stroke amount of the shaft member 4 with respect to the guide member 3. In this embodiment, under a state in which the shaft member 4 has been completely accommodated inside the guide groove 30 of the guide member 3, the locking protrusion 50 is located at a center of the regulating hole 42 in the longitudinal direction.

Figure 7:
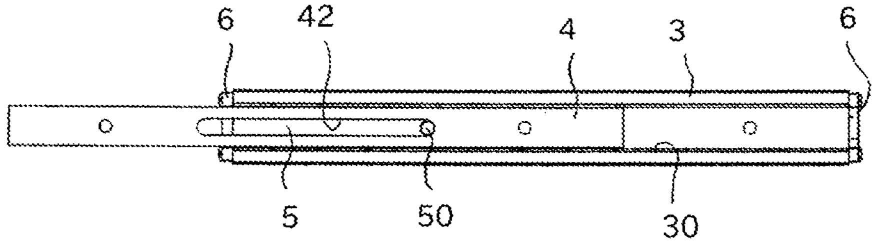
FIG. 7 is a plan view for illustrating a maximum stroke position of the shaft member with respect to the guide member.

Further, when the shaft member 4 is gradually moved relative to the guide member 3, the cage 5 moves inside the guide groove 30 of the guide member 3, and simultaneously, the shaft member 4 moves relative to the cage 5 by the same amount as a movement amount of the cage 5 with respect to the guide member 3. Eventually, as illustrated in FIG. 7, the cage 5 is brought into abutment against the stopper 6, and at the same time, the locking protrusion 50 of the cage 5 reaches the end part of the regulating hole 42 of the shaft member 4 in the longitudinal direction, and hence, the shaft member 4 becomes immovable relative to the cage 5. That is, as illustrated in FIG. 7, a position of the shaft member 4 at the time when the cage 5 is brought into abutment against the stopper 6, and simultaneously, the locking protrusion 50 is brought into abutment against the end part of the regulating hole 42 in the longitudinal direction is a maximum stroke position of the shaft member 4 with respect to the guide member 3.

Figure 8:
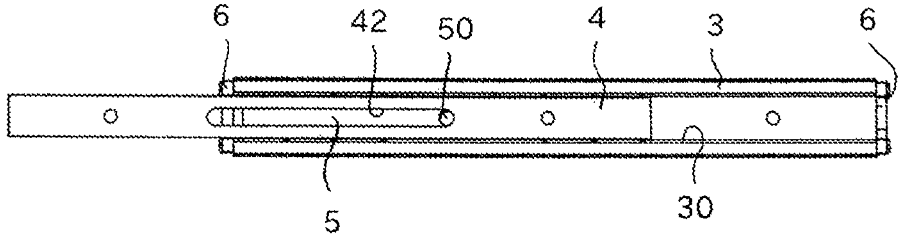
FIG. 8 is a plan view for illustrating a state in which positional displacement has occurred between the cage and the guide member.
Figure 9:
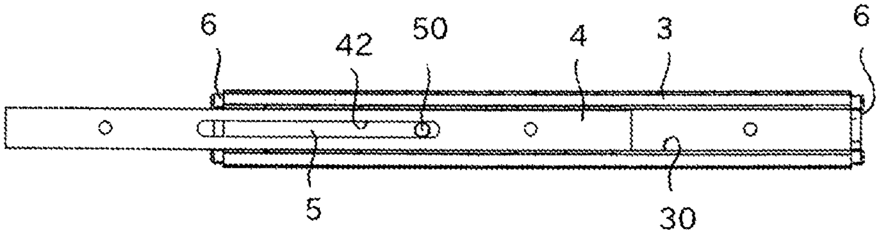
FIG. 9 is a plan view for illustrating a state in which positional displacement has occurred between the cage and the shaft member.

However, while the shaft member 4 repeatedly performs a reciprocating motion with respect to the guide member 3, a position of the cage 5 is displaced relative to the guide member 3 in some cases. For example, as illustrated in FIG. 8, in some cases, the locking protrusion 50 of the cage 5 reaches the end part of the regulating hole 42 of the shaft member 4, but the cage 5 is not brought into abutment against the stopper 6 fixed to the guide member 3. Further, conversely, as illustrated in FIG. 9, in some cases, the cage 5 is brought into abutment against the stopper 6 fixed to the guide member 3, but the locking protrusion 50 of the cage 5 does not reach the end part of the regulating hole 42 of the shaft member 4. In those two cases, a stroke amount of the shaft member 4 with respect to the guide member 3 becomes smaller than the maximum stroke amount illustrated in FIG. 7. Further, when the shaft member 4 is forcibly moved to the maximum stroke amount, the rollers 2 serving as the rolling elements are brought into sliding contact with the rolling groove 33 of the guide member 3 and the rolling groove 41 of the shaft member 4.

When positional displacement occurs among the guide member 3, the cage 5, and the shaft member 4 as described above, the positional displacement among those three members can be reset by forcibly moving the shaft member 4 relative to the guide member 3. Such a reset operation is performed once each time the shaft member 4 is caused to stroke with respect to the guide member 3 a predetermined number of times.

In the above-mentioned reset operation, the shaft member 4 is forcibly moved leftward on the drawing sheet from a state as illustrated in FIG. 8 or FIG. 9, to thereby produce a state, as illustrated in FIG. 7, in which the cage 5 is brought into abutment against the stopper 6, and simultaneously, the locking protrusion 50 of the cage 5 is locked to the end part of the regulating hole 42 of the shaft member 4. At the time of the movement of the shaft member 4 in the reset operation, the rollers 2 serving as the rolling elements slide on the rolling groove 41 of the shaft member 4 and the rolling groove 33 of the guide member 3 without rolling. Hence, it is required that a force larger than usual be applied to the shaft member 4 to move the shaft member 4, and by an amount corresponding thereto, an excessive load is applied to the locking protrusion 50 provided upright on the cage 5.

In this respect, in the linear guide device of this embodiment, the regulating hole 42 into which the distal end of the locking protrusion 50 is to be inserted is formed in the shaft member 4. Hence, even when the locking protrusion 50 is strongly brought into abutment against the end part of the regulating hole 42 in the longitudinal direction, there is no concern in that deformation, such as buckling, of the regulating hole 42 may be caused. Further, the locking protrusion 50 is provided upright on the cage 5, and hence, even when a wall thickness of the cage 5 is reduced, it is possible to provide sufficient strength for the locking protrusion 50 by designing any appropriate shape and thickness of the locking protrusion 50 and any appropriate shape of the root part of the locking protrusion 50. As a result, deformation of the locking protrusion 50 due to the abutment against the regulating hole 42 can be prevented.

Further, the locking protrusion 50 can be formed integrally with the cage 5 by using a method such as injection molding of a synthetic resin. Also in this respect, it is possible to provide sufficient strength for the locking protrusion 50 while enhancing a degree of freedom in design of the cage 5 including the locking protrusion 50.

Hence, according to the linear guide device of this embodiment, sufficient strength of the locking protrusion 50 or the regulating hole 42 against the reset operation for the cage 5 can be ensured, and the degree of freedom in design of the cage 5 can be enhanced. Accordingly, the wall thickness of the cage 5 can be set smaller, and hence it is possible to minimize the gap between the guide member 3 and the shaft member 4 to achieve reduction in size of the linear guide device.

In the embodiment as described with reference to the drawings, while the stoppers 6 for locking the cage 5 are provided at both ends of the guide member 3 in the longitudinal direction, respectively, the regulating hole 42 into which the distal end of the locking protrusion 50 of the cage 5 is to be inserted is formed in the shaft member 4. However, conversely, even in a case in which, while the stoppers for locking the cage 5 are provided at both ends of the shaft member 4 in the longitudinal direction, respectively, the regulating hole 42 into which the distal end of the locking protrusion 50 of the cage 5 is to be inserted is formed in the guide member 3, the present invention can be implemented.

Further, in the embodiment as described with reference to the drawings, the stoppers 6 for locking the cage 5 are provided at the both ends of the guide member 3 in the longitudinal direction, respectively. However, in accordance with a direction in which the shaft member is pulled out from the guide member, the stopper 6 may be provided only at one end part of the guide member 3 in the longitudinal direction. In addition, a method of fixing the stoppers 6 to the guide member 3 or the shaft member 4 is not limited to screwing, but may be appropriately changed in design as long as movement of the cage 5 can be reliably locked by the stoppers 6.

The invention claimed is:

1. A linear guide device, comprising:

a guide member including a guide groove surrounded by a base portion and a pair of side wall portions, each of the side wall portions having a rolling groove for rolling elements, which is formed along a longitudinal direction of the guide groove so as to face the guide groove;

a shaft member which is configured to move inside the guide groove of the guide member along the longitudinal direction of the guide groove, and includes rolling grooves facing the rolling grooves of the guide member;

a plurality of rolling elements configured to roll between the rolling groove of the guide member and the rolling groove of the shaft member while bearing a load; and a cage, which is configured to be arranged inside the guide groove of the guide member so as to be present in a gap between the guide member and the shaft member, and has the plurality of rolling elements being rotatably arranged in the cage, wherein any one of the guide member or the shaft member has a stopper provided at an end part in a longitudinal direction and configured to allow the cage to be brought into abutment against the stopper, wherein, while another one of the guide member or the shaft member has a regulating hole which is elongated along a moving direction of the shaft member, the cage has a locking protrusion provided upright on the cage and having a distal end part inserted into the regulating hole, and wherein a root portion of the locking protrusion is smoothly continuous with the cage, an expanded portion corresponding to the root portion of the locking protrusion is provided at the edge of the regulating hole of the shaft member so as to face the cage.

2. The linear guide device according to claim 1, wherein the cage is molded integrally with the locking protrusion from a synthetic resin.

3. The linear guide device according to claim 1, wherein, while the locking protrusion has a columnar shape and includes the root portion whose diameter increases toward the cage without forming a step, the root portion being continuous with the cage.

4. The linear guide device according to claim 1, wherein the guide member has the stopper provided at an end part in a longitudinal direction and configured to allow the cage to be brought into abutment against the stopper, and the shaft member has the regulating hole which is elongated along a moving direction of the shaft member.

* * * * *